W. KLEINOW.
FLEXIBLE COUPLING.
APPLICATION FILED MAR. 1, 1915.
1,157,553.
Patented Oct. 19, 1915.
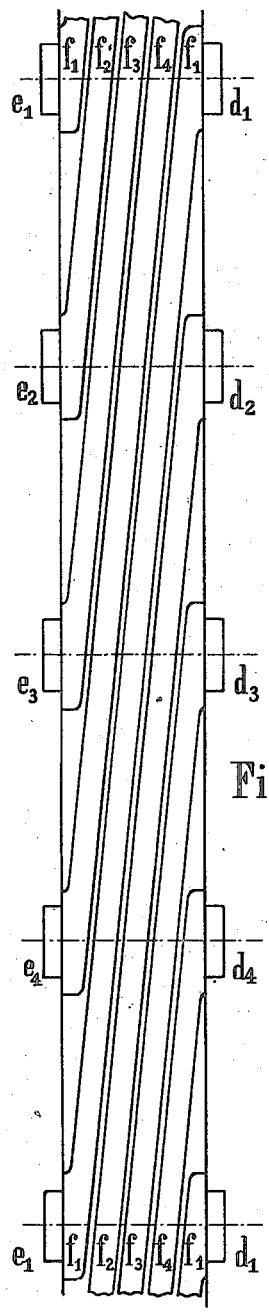
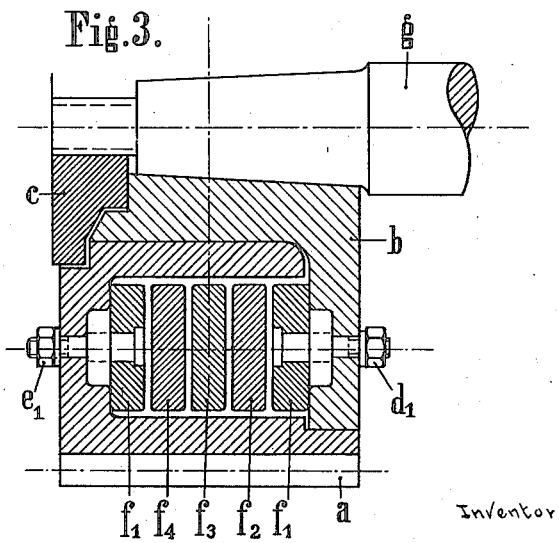
Witnesses
Inventor
Walter Kleinow.
By Mason Fenwick & Lawrence
Attorneys.

UNITED STATES PATENT OFFICE.

WALTER KLEINOW, OF BRESLAU, GERMANY.

FLEXIBLE COUPLING.

1,157,553.  Specification of Letters Patent.  Patented Oct. 19, 1915.

Application filed March 1, 1915. Serial No. 11,400.

*To all whom it may concern:*

Be it known that I, WALTER KLEINOW, subject of the German Emperor, and residing at Breslau, Germany, have invented certain new and useful Improvements in Flexible Couplings, of which the following is a specification.

The present invention relates to a means for connecting 2 coaxial machine parts elastically to each other. For this purpose I employ springs which spirally encompass the axle and thereby unite the two coupling parts. A plurality of springs of this kind are mounted side by side in such manner that the points of application at each coupling part are displaced with regard to each other for an amount corresponding to the number of springs, so that they are uniformly distributed around the whole axle.

The new coupling-system grants the advantage that a great number of short and weak springs may be substituted by a small number of long and strong springs. Furthermore it also insures a considerable economy of space, as the springs are mounted with very great compactness and, before everything, require little space in a radial direction. For such reason the new invention is of a special importance, i. e. with toothed wheels and the elastic mounting of the armature of an electric motor for railways and the like on its axle.

In the accompanying drawings, forming part of the present specification, an embodiment of the new invention is shown when applied to a toothed wheel.

Figure 1 shows a view of the mounted wheel, Fig. 2 a development of the springs and Fig. 3 a radial section through the wheel.

According to this drawing the nave $b$ is secured on the shaft $g$ and on the former the rim $a$ is coaxially mounted. Both parts are protected by a nut $c$ against axial displacements. In tangential direction, however, a certain movement of the rim $a$ with respect to the nave $b$ may be allowed to take place, which movement is rendered possible by the insertion of the springs $f_1, f_2, f_3, f_4$, which springs are mounted edgewise around the shaft $g$. The ends of each spring are secured, on the one side, to the nave $b$ and, on the other side, to the toothed rim $a$, by means of screws, designed by $d_1, e_1; d_2, e_2; d_3, e_3; d_4, e_4$ according to their pertinence to one of these springs. An end of each spring is secured to the nave $b$, while the other end is secured to the toothed rim $a$ by securing means such as the bolts $d_1, e_1; d_2, e_2; d_3, e_3; d_4, e_4$. The ends of the springs are equally spaced about the axis. In the arrangement according to the drawing the four springs are spaced at 90°, but the spacing will depend upon the number of springs employed.

What I claim as my invention and desire to secure by United States Letters Patent is—

1. As a new means for the resilient coupling of two machine parts a plurality of springs, spirally encompassing the axle side by side, whose points of application are uniformly distributed on both sides around the axle, substantially as set forth.

2. As a new means for the resilient coupling of two machine parts a plurality of springs of a flat sectional area, spirally encompassing the axle edgewise, which springs are secured each at one end by screws to either of the two coupling parts, substantially as set forth.

3. The combination with two coaxial machine parts of springs spirally encompassing the axle side by side, with one of the parts formed as a toothed rim.

In testimony whereof I affix my signature in presence of two witnesses.

WALTER KLEINOW.

Witnesses:
 WOLDEMAR HAUPT,
 HENRY HASPER.